A. R. BROCKSMITH.
DEEP WELL PUMP.
APPLICATION FILED AUG. 4, 1921.
1,430,789.
Patented Oct. 3, 1922.
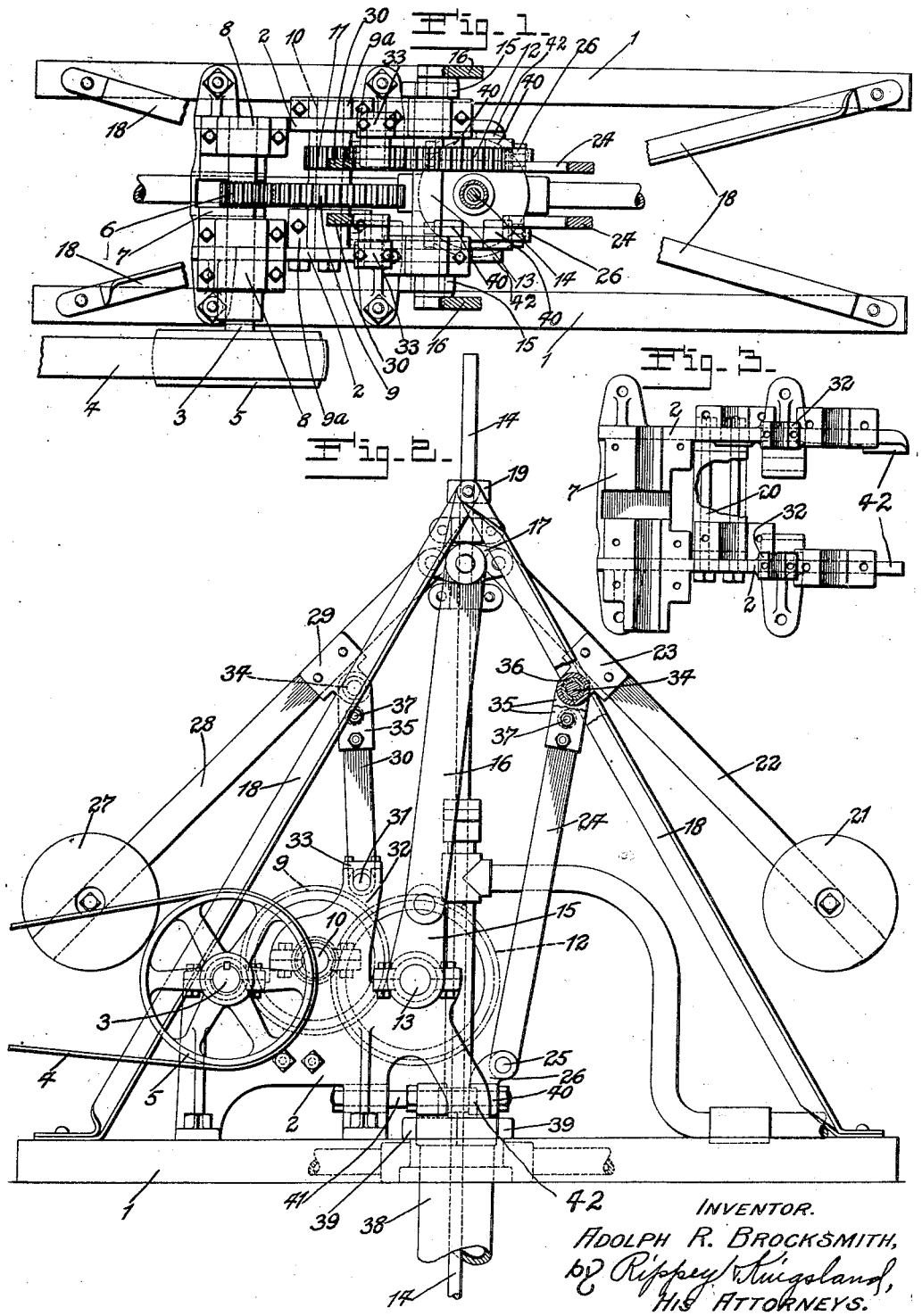
INVENTOR.
ADOLPH R. BROCKSMITH,
by Rippey & Kingsland,
HIS ATTORNEYS.

Patented Oct. 3, 1922.

1,430,789

UNITED STATES PATENT OFFICE.

ADOLPH R. BROCKSMITH, OF ST. LOUIS, MISSOURI.

DEEP-WELL PUMP.

Application filed August 4, 1921. Serial No. 489,674.

*To all whom it may concern:*

Be it known that I, ADOLPH R. BROCKSMITH, a citizen of the United States, residing at St. Louis, Missouri, have invented a new and useful Deep-Well Pump, of which the following is a specification.

This invention relates to deep well pumps.

An object of the invention is to provide an improved pump operating mechanism for use in pumping oil wells or other uses to which the invention may be applied; and in which the operating mechanism is of strong, simple and durable construction, and of such arrangement that the mechanism may readily be assembled for use or taken apart for purposes of repair or other needed purposes.

Another object of the invention is to provide a machine for operating oil well pumps and the like, equipped with a novel and improved system of counterweights arranged and combined so that they will cooperate with the operating mechanism of the machine to maintain and to operate the pump in a better and more efficient manner than do the machines which do not possess the advantages of construction and operation that characterize this invention.

Another object of the invention is to provide an equipment for the system of counterweights for preventing damage or injury to any parts of the machine or to the pipe line in case the pivotal supports for the counterweights become broken or disengaged from the beams or from the bearings from which the supports are mounted.

Another object of the invention is to provide a machine for operating oil well pumps and the like, with a novel and efficient system of gearing and with a cooperatively associated system of counterweights by the cooperation of which the oil well pump, or the like, is operated without being subjected to many of the strains, jerks and violent vibrations to which the pumps are usually subjected by the operation of machines of different construction and mode of operation.

Other objects will appear from the following description, reference being made to the drawing, in which Fig. 1 is a plan view of the operating mechanism.

Fig. 2 is a side elevation having a part of the gearing shown diagrammatically.

Fig. 3 is a plan view of the framing of the machine with the gearing and operating mechanism omitted.

As shown, the operating mechanism is mounted on an appropriate support or base 1, adapted to rest upon the ground at the well in which the pump is to be operated, and adapted to receive the upper part of the pump mechanism between the sides thereof. A pair of strong supports or side frames 2 are secured to the base in parallel spaced relationship, and are provided with alined bearings for supporting the shafts and other operating parts of the machine. A horizontal drive shaft 3 is journaled in bearings near the ends of the side frames that are farthest from the well, and is driven by a belt 4 passing over a pulley 5 on said shaft. A small gear wheel 6 is rigid on the shaft 3 between the side frames. The side frames 2 are given rigidity by a tie-casting 7 secured thereto near the upper ends of said frames and having a notch therein to receive the gear wheel 6. The tie-casting 7 gives rigidity to the side frames and has a channel formed therein in which the shaft 3 is received. The shaft 3 is held in the bearings in the side frames 2 by plates 8 bolted to said frames. The plates 8 overlap and are bolted to the tie-casting 7.

The small gear wheel 6 on the drive shaft meshes with a large gear 9, attached to a shaft 10 which is journaled in bearings in the side frames 2 about midway of the ends of said side frames. The shaft 10 is retained in said bearings by plates 9^A bolted to flanges on the side frames 2 respectively. A small gear 11, rigid on the shaft 10, meshes with a large gear wheel 12, rigid on a shaft 13 journaled in bearings near the ends of the side frames 2 opposite from the ends at which the drive shaft 3 is supported. By this train of gearing the shaft 13 is rotated at a reduced speed. The speed of rotation of the shaft 13 is such that said shaft may be properly used as a crank shaft to operate the pump mechanism.

The pump device 14 extends upwardly out of the well between the side frames 2 and near the crank shaft 13. A crank arm or lever 15 is attached to each end of the shaft 13, and said crank arms or levers are at the outer sides of the side frames 2. A connecting rod or bar 16 is pivotally connected with each of the crank arms or levers 15 for proper oscillatory movements, and have their upper ends pivoted to a clamp bracket 17 attached to the pump device 14. As a result of this construction and arrangement, the pump device 14 is properly operated at the desired and proper speed when the crank shaft 13 is operated by the gearing.

A number of strong braces 18 have their lower ends rigidly attached to the base members 1 near the respective ends of said base members. Said braces converge upwardly and inwardly, and all of them are secured to a guide bearing 19 supported above and beyond extent of upward movement of the clamp bracket 17 for guiding the pump device 14 and preventing undue vibration thereof when the machine is in use.

Intermediate portions of the side frames 2 are braced and strengthened by a tie-member 20.

The machine is equipped with a number of conterweights to facilitate and maintain proper operation thereof. As shown, there are two of such counterweights. The counterweight 21 is supported by the outer end of a beam 22, the inner end of which beam is pivoted to the clamp bracket 17. The intermediate portion of the beam 22 is provided with a bracket 23 to which the upper ends of a pair of supporting bars 24 are pivoted. The lower ends of the supporting bars 24 have lateral extensions 25 journaled for pivotal movements in bearings provided in parts 26 having rigid connection with the framing of the machine.

The other counterweight 27 is supported on the outer end of a beam 28 whose inner end is pivoted to the clamp bracket 17 on the side of the pump device 14, opposite from the side to which the pump 22 is pivoted. The intermediate portion of the beam 28 is provided with a bracket 29 to which the upper ends of a pair of supporting bars 30 are pivoted. The lower ends of the supporting bars 30 have lateral extensions 31 journaled for pivotal movements in bearings in upwardly extended portions 32 of the side frames 2. The extensions 31 are held in the bearings by fittings 33.

The pivots by which the supporting bars 24 and 30 are connected with the brackets 23 and 29, respectively, comprise wrist pins 34 supported by removable fitting members 35 removably attached to the upper ends of the bars 24 and 30 respectively. A sleeve 36 is mounted on the wrist pins, and the brackets 23 have holes therein receiving said sleeves. The upper bolts 37, by which the members 35 are attached to the bars 24, constitute spacers for the upper ends of the bars 24 and 30 and also function to catch and support the beams 22 and 28 in case the pivots 34 wear out or break. By arranging the bolts 37 so as to catch and support the beams 22 and 28 in the emergencies mentioned, the counterweights are prevented from striking the machine or the pipes leading from the pump. Thus, an existing danger of the well becoming fired is eliminated.

The oil well casing 38 extends between the base members 1 of the machine. A pair of clamp members 39 are clamped upon the end of the well casing 38 near the surface of the ground to hold the machine permanently in accurate position. The bearing parts 26 to which the lower ends of the supporting bars 24 are pivoted are rigid with one of the clamp members 39. Each of the clamp members 39 has a pair of bosses 40 having holes therein. Bolts 41 pass through the holes in the bosses 40 and are equipped with nuts which are operative and adjustable to clamp the clamp members 39 upon the well casing 38. The bolts 41 are also rigidly engaged with the side frames 2 of the machine, thus providing a rigid connection between the machine and the well casing.

The side frames 2 have feet 42 bearing upon the clamp members 39 to give rigidity to the assembly.

From the foregoing it will be seen that my invention serves all of its intended purposes and obtains all of the desired objects made apparent from the disclosure. The machine is not subject to the lateral stresses and strains to which the machines of different construction are subject. A more uniform operation is maintained since by the cooperation of the novel gearing mechanism and the system of counterweights many of the jars and violent vibrations that would otherwise occur are avoided. By using the novel system of counterweights that I have provided, each of the counter-weights is of less weight than would be required if only a single counterweight were used. The weight is thus more evenly distributed and utilized.

I do not restrict myself to unessential limitations or features of construction. It is apparent that the construction and arrangement described may be varied without departure from the nature and principle of the invention, as set forth in the appended claims.

What I claim and desire to secure by Letters Patent is:—

1. In a machine of the character described, the combination of a pair of spaced side frames, elements holding the side frames in rigid spaced relationship, a drive shaft journaled in the side frames, an additional shaft journaled in the side frames, gear wheels on said shafts between the side frames for driving the additional shaft from the drive shaft, a crank shaft journaled in the side frames, gearing between the side frames for driving the crank shaft from the additional shaft, connections operated by said crank shaft for operating a pump device, a number of counter-weight beams having their inner ends pivotally connected with a pump device, a pair of supporting bars for each of said beams, supports rigid with the side frames, pivots connecting the lower ends of said supporting bars with said supports respectively, and means pivotally connecting the upper ends of said bars with said beams respectively.

2. In a machine of the character described, the combination of a pair of spaced side frames, elements holding said side frames in rigid spaced relationship, a crank shaft journaled in the side frames, gearing supported between the side frames for operating the crank shaft, pump operating connections driven by the crank shaft, a pair of upwardly converging braces at each end of the side frames, means holding the lower ends of said braces in rigid relationship with respect to the side frames, a guide for the pump device supported by said braces above the extent of movement of said pump operating connections, a counter-weight beam pivotally supported between each of said pairs of braces, and connections for pivotally uniting said counter-weight beams to the pump device.

3. In a machine of the character described, the combination of a pair of spaced side frames, supports on which said frames are rigid, elements for holding said side frames in rigid spaced relationship, a crank shaft journaled for rotation in said side frames, gearing between said side frames for operating said crank shaft, connections operated by the crank shaft for operating a pump device, two pairs of braces having their lower ends secured to said supports respectively in rigid relationship with respect to the side frames, said braces converging upwardly, a guide for the pump device supported by said braces above the extent of movement of said operating connections, a number of counterweight devices, supports for said counter-weight devices between said braces, means for pivotally uniting said counterweight devices to the pump device, clamping members for securing said side frames in rigid connection with a well casing, and means for securing the clamp members in rigid connection with the machine and with the well casing.

4. In a machine of the character described, the combination of a pair of spaced side frames, elements holding the side frames in rigid spaced relationship, a crank shaft journaled in the side frames, gearing supported between the side frames for operating the crank shaft, connections driven by the crank shaft for operating a pump device, supports on which the side frames are rigidly mounted, a guide for the pump device, braces having their upper ends secured to said guide and converging downwardly and outwardly and having their lower ends rigid with said supports, supporting bars having their lower ends pivoted to the side frames and their upper ends arranged to operate between said braces, counter-weight beams pivotally connected to the upper ends of said supporting bars, means for pivotally connecting the inner ends of said beams to a pump device, and a counterweight on the outer end of each of said beams.

5. In a machine of the character described, the combination of a pair of spaced side frames, elements holding the side frames in rigid spaced relationship, a crank shaft supported by the side frames, mechanism supported between the side frames for rotating said shaft, a pair of crank arms on the crank shaft, connecting rods pivoted to said crank arms, a clamping bracket pivoted to the ends of said connecting rods, a frame structure extending above the side frames, a guide supported by said frame structure for guiding a pump device, and a number of counterweight beams pivotally connected to said clamping bracket.

6. In a machine of the character described, the combination of a pair of spaced side frames, elements holding the side frames in rigid spaced relationship, a crank shaft supported by the side frames, mechanism supported between the side frames for rotating said shaft, a pair of crank arms on the crank shaft, connecting rods pivoted to said crank arms, a clamping bracket pivoted to the ends of said connecting rods, a frame structure extending above the side frames, a guide supported by said frame structure for guiding a pump device, a number of counterweight beams pivotally connected to said clamping bracket, and supporting bars pivotally supporting said beams.

7. In a machine of the character described, the combination of a crank shaft, a crank on each end of said shaft, a connecting bar pivotally connected with each crank, a bracket for operating a pump device pivotally connected to the upper ends of said bars, a pair of counter-weight beams having their inner ends pivoted to said bracket, a pair of supporting bars for each beam, means in connection with each pair of said supporting bars for supporting the corresponding beam for pivotal movements, and a counter-weight on the outer end of each of said beams.

8. In a machine of the character described, the combination of a clamping bracket adapted to be attached to a pump device, a crank shaft, connections from the crank shaft to the clamping bracket for operating the same, a pair of counterweight beams pivoted to the clamping bracket and extending in opposite directions therefrom, and oscillating supports for said beams.

9. In a machine of the character described, the combination of a clamping bracket adapted to be attached to a pump device, a crank shaft, connections from the crank shaft to the clamping bracket for operating the same, a pair of counterweight beams pivoted to the clamping bracket and extending in opposite directions therefrom, oscillating supports for said beams, and means for binding the machine in connection with a well casing.

10. In a machine of the character described, the combination of a clamping bracket adapted to be attached to a pump device, gearing, mechanism operated by the gearing for operating the clamping bracket, a counterweight beam pivoted to said bracket, a counterweight on said beam, and an oscillating support connected to the beam between said counterweight and said bracket.

11. In a machine of the character described, the combination of a clamping bracket adapted to be attached to a pump device, gearing, mechanism operated by the gearing for operating the clamping bracket, a counterweight beam pivoted to said bracket, a counterweight on said beam, an oscillating support connected to the beam between said counterweight and said bracket, and an emergency catch device carried by said oscillating support below the beam for the purpose described.

12. In a machine of the character described, a clamping bracket adapted to be attached to a pump device, operating mechanism connected with said bracket, a counter weight beam having its inner end pivoted to said bracket, a pair of supporting bars for said beam, means between the upper ends of said bars for supporting said beam, means for supporting the lower ends of said bars, and a counter-weight on the outer end of said beam.

13. In a machine of the character described, a crank shaft, a crank attached to each end of said crank shaft, a connecting rod pivoted to each of said cranks, and a clamping bracket pivotally connected to the upper ends of said two connecting rods, in combination with a counterweight beam having its inner end pivoted to said clamping bracket, a counterweight supported by the outer portion of said beam, and an oscillating support pivoted to said beam between said counterweight and said bracket.

14. In a machine of the character described, a crank shaft, two cranks on said shaft, a connecting rod pivoted to each of said cranks, a clamping bracket pivotally supported between the upper ends of said two connecting rods and adapted to be attached to a pump device, two counterweight beams pivoted to opposite sides of said bracket, and oscillating supports for said beams.

15. In a machine of the character described, a crank shaft, two cranks on said shaft, connecting rod pivoted to each of said cranks, a clamping bracket pivotally supported between the upper ends of said two connecting rods and adapted to be attached to a pump device, two counterweight beams pivoted to opposite sides of said bracket, oscillating supports for said beams, and a guide for the pump device supported above extent of movement of said clamping bracket.

16. In a machine of the character described, two side frames, a crank shaft supported by said frames for rotary operation, cranks on said shaft, connecting rods pivoted to said cranks, a clamping bracket pivoted to the upper ends of said connecting rods and adapted to be attached to a pump device, a counterweight beam having its inner end pivoted to said bracket, a counterweight supported by the outer end of said beam, and a pair of supporting bars having their lower ends pivoted to said frames respectively and having their upper ends pivotally connected with said beam.

ADOLPH R. BROCKSMITH.